United States Patent
Wissler et al.

(10) Patent No.: US 7,100,741 B2
(45) Date of Patent: Sep. 5, 2006

(54) ROLLER ASSEMBLY FOR A LADDER

(75) Inventors: Reid L. Wissler, Brownstone, PA (US); Jason L. Longenecker, Denver, PA (US); James A. Salmi, Lititz, PA (US)

(73) Assignee: Spartan Motors, Inc., Charlotte, MI (US)

( * ) Notice: Subject to any disclaimer, the term of this patent is extended or adjusted under 35 U.S.C. 154(b) by 337 days.

(21) Appl. No.: 10/828,769

(22) Filed: Apr. 21, 2004

(65) Prior Publication Data

US 2005/0247524 A1    Nov. 10, 2005

(51) Int. Cl.
*E06C 5/04*    (2006.01)
*E06C 5/06*    (2006.01)

(52) U.S. Cl. ...................... 182/207; 182/208
(58) Field of Classification Search .............. 187/207, 187/208, 230, 127, 129, 109, 107, 108, 20, 187/36
See application file for complete search history.

(56) References Cited

U.S. PATENT DOCUMENTS

| | | | |
|---|---|---|---|
| 1,949,972 A * | 3/1934 | Murphy ................. | 182/212 |
| 3,910,264 A * | 10/1975 | Mahieu ................. | 182/69.4 |
| 3,921,758 A * | 11/1975 | Kozai ................... | 182/66.1 |
| 4,754,843 A | 7/1988 | Anderson | |
| 5,071,264 A | 12/1991 | Franke et al. | |
| 5,103,934 A * | 4/1992 | Brooks ................. | 182/19 |
| 5,123,503 A | 6/1992 | Clarke | |
| 5,172,952 A | 12/1992 | Lasnetski | |
| 5,226,703 A | 7/1993 | Norman | |
| 5,339,919 A | 8/1994 | Boyd | |
| 5,878,836 A * | 3/1999 | Huang .................. | 182/86 |
| 6,688,426 B1* | 2/2004 | Mikros ................. | 182/17 |
| 6,725,969 B1* | 4/2004 | Meister ................ | 182/8 |
| 6,913,113 B1* | 7/2005 | Shannon .............. | 182/22 |
| 7,036,631 B1* | 5/2006 | Feik et al. ........... | 182/129 |

* cited by examiner

*Primary Examiner*—Hugh B. Thompson, II
(74) *Attorney, Agent, or Firm*—Foster, Swift, Collins & Smith, P.C.; Allan O. Maki

(57) ABSTRACT

An aerial ladder roller assembly to improve the function of the ladder during extension and retraction of sections of a multiple-section aerial ladder. One embodiment has a plurality of aligned apertures for rotatably mounting and a roller that is rotatably mounted in a housing. The housing has a roller pad and an aperture through which a roller extends. The housing is adapted for pivotal mounting at a point approximately central to the length of the axis. A roller is rotatably mounted in the housing on each side of the pivotal mounting point. A pair of rollers is rotatably mounted in the housing on each side of the pivotal mounting point. Also provided is a multiple-section ladder, having at least two nested sections with a housing having at least one roller is rotatably and pivotally mounted extending through an aperture. The slide plate of the second section juxtaposes the roller assembly.

15 Claims, 7 Drawing Sheets

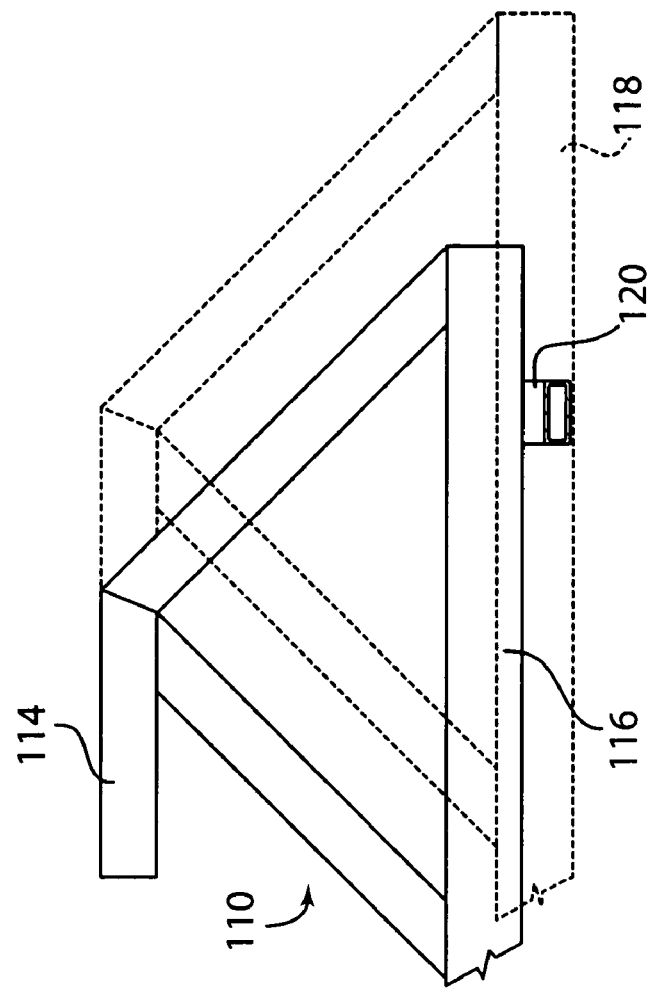
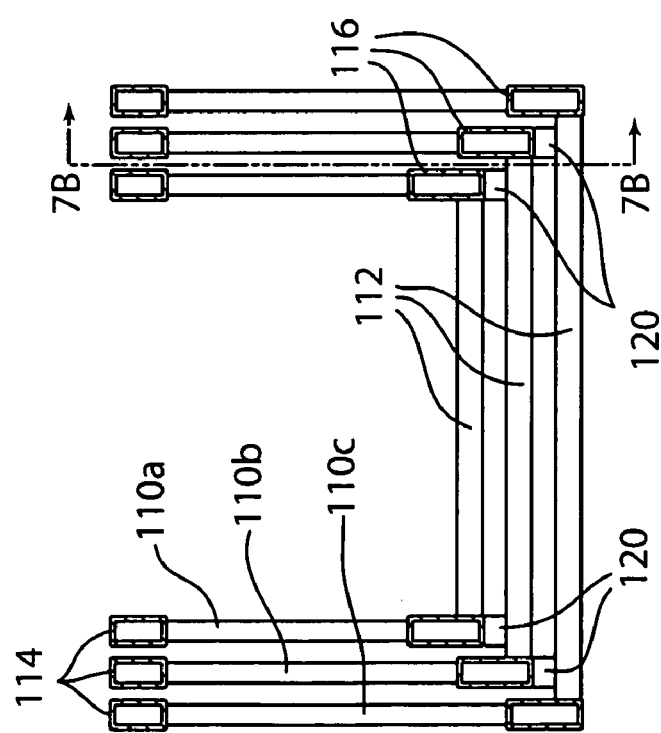

US 7,100,741 B2

ROLLER ASSEMBLY FOR A LADDER

BACKGROUND OF THE INVENTION

1. Field of the Invention

The present invention generally relates to multiple-section aerial ladders and particularly to an aerial ladder roller assembly to improve the function of the ladder during extension and retraction of ladder sections.

2. Discussion of Related Art

A common problem in the extension of telescoping ladders, especially very large ladders, such as aerial ladders found on fire trucks, is the slipping, sticking, and surging that may occur during the extension and retraction of the ladder sections. Ladder sections typically follow tracks or slides that require a high degree of maintenance through regular greasing to reduce the defects cited above. Otherwise, the surging motion reduces the life of cables used to extend and retract ladder sections due to the dynamic loads encountered. Since dependability in fire truck aerial ladders is essential, there has been a resistance in the art to cure these problems.

One possible solution to the problems is the use of roller assemblies at contact points of the ladder sections. No successful such roller assemblies are known in the art most likely because such application would need to be highly dependable yet easily maintained. Further, single metal rollers have not been successful due to line contacts between the ladder rail and the roller causing high stresses and distortion of the base rails of the ladder.

Rollers attached to ladders are known in the art, but not for the solution of problems cited above. For example, U.S. Pat. No. 4,754,843 to Anderson discloses a roller assembly attached to the top of a ladder to assist in ladder increasing and decreasing inclination. A similar device is also found in U.S. Pat. No. 5,123,503 to Clarke. U.S. Pat. No. 5,226,703 to Norman discloses the use of rollers to facilitate movement of "endless tracks" in large construction equipment, but only for support rollers. U.S. Pat. No. 5,172,952 to Lasnetski also discloses the use of rollers on ladders but only to assist in storing the ladder. Here a roller is placed at the end of the ladder to roll on a track suspended from the ceiling of a truck. The roller is not integral to a slide mechanism and is not designed to support a load on the ladder while in use.

Thus, there is a desire and need in the art to provide a dependable and easily maintainable roller assembly integral to the slide tracks of a multi-section ladder.

SUMMARY OF THE INVENTION

Accordingly, the present invention provides an aerial ladder roller assembly to improve the function of the ladder during extension and retraction of sections of a multiple-section aerial ladder.

In one embodiment of the present invention an assembly for a multi-section extension ladder is included having a plurality of aligned apertures for rotatably mounting and a roller that is rotatably mounted in a housing. The housing comprises a roller pad and an aperture through which a roller extends. The housing is adapted for pivotal mounting at a point approximately central to the length of the axis. A roller is rotatably mounted in the housing on each side of the pivotal mounting point. A pair of rollers is rotatably mounted in the housing on each side of the pivotal mounting point.

The roller and pad may be made of a dense polymer, an ultra high molecular weight plastic, or metal and is flush with or projects slightly beyond (e.g., 2 millimeters) an outer surface of the roller pad. The housing may be adapted for pivotal mounting at a point approximately central to the length of said axis.

A further aspect of this invention is a multiple-section ladder, having two sections that have parallel rungs connected to base rails. The second section nests within the first section and has a slide plate on a surface of its base rail which faces the first section. The ladder also has an assembly that has a housing where at least one roller is rotatably and pivotally mounted to the first ladder section. It is also mounted adjacent each rail of the first ladder section. The roller housing includes a roller pad that has a roller extending through an aperture. The slide plate of the second section juxtaposes the roller assembly of the first ladder section. A pair of rollers are rotatably mounted in the housing on each side of the pivotal mounting point.

Other features of the present invention will become more apparent to persons having ordinary skill in the art to which the present invention pertains from the following description and claims taken in conjunction with the accompanying figures.

BRIEF DESCRIPTION OF THE FIGURES

The foregoing features, as well as other features, will become apparent with reference to the description and figures below, in which like numerals represent like elements, and in which:

FIG. 7 is an end view 7a and side view 7b of another prior art pad slide mechanism.

DETAILED DESCRIPTION OF THE INVENTION

The present invention generally relates to multiple-section ladders and particularly to an assembly to improve the function of the ladder during extension and retraction of ladder sections. The present invention uses roller assemblies that extend through slides on pads positioned at the point of contact between the ladders. The roller assemblies allow for pivoting and constant roller pressure and are particularly suited for applications in aerial ladders found on fire trucks. The assemblies are dependable and easy to maintain and reduce the frictional forces that must be overcome to extend and retract the ladder sections.

Figure 6:
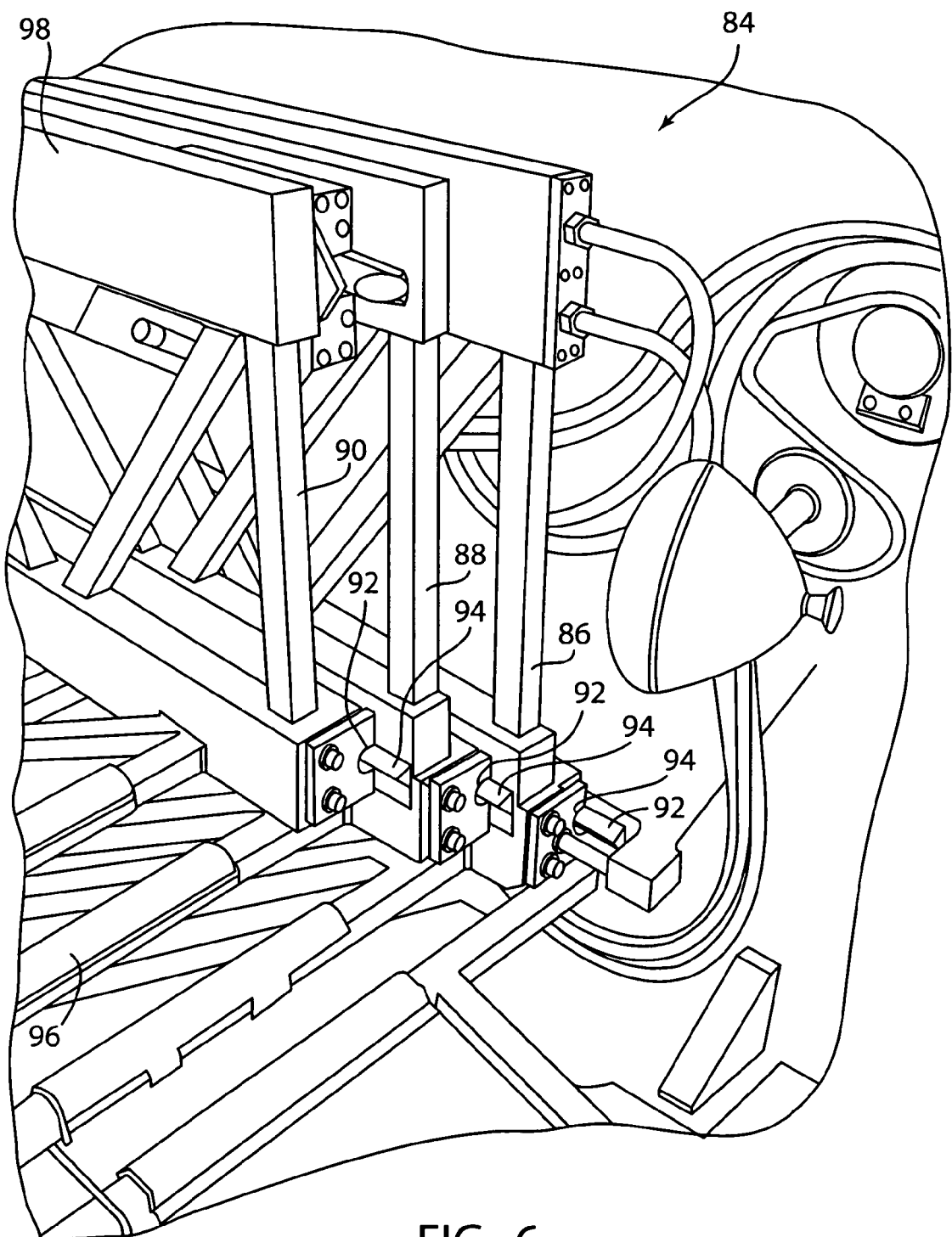
FIG. 6 is a perspective view of a prior art aerial ladder slide mechanism.

Referring now to the figures, FIG. 6 shows a prior art aerial ladder for a fire truck generally at 84. As shown, ladder 84 has multiple sections 86, 88, 90, which are moveable mounted by tracks 92 and slide 94. During the extension and retraction of ladder sections 86, 88, and 90, slides 94 are disposed and slide within tracks 92. Ladder 84 has rungs 96 and handrails 98. While this design is well known and functional, it may slip, stick, and surge during extension and retraction often resulting in reduced cable life. These problems have been attempted to be reduced through regular greasing and other time consuming maintenance FIGS. 7A and B show another example of a prior art pad assembly slide mechanism for a multiple section aerial ladder. In this illustration, three ladder sections 110a, 110b, and 110c are nested together. Brace members 112, slide pads 120, handrails 114, and side rails 116 are identified for reference. As shown, an outer side rail 118 is added for clarity. While extending and retracting the ladder sections, side rails 116 slide against slid pads 120 mounted on brace members 112 of the ladder section 110 below.

Figure 4A:
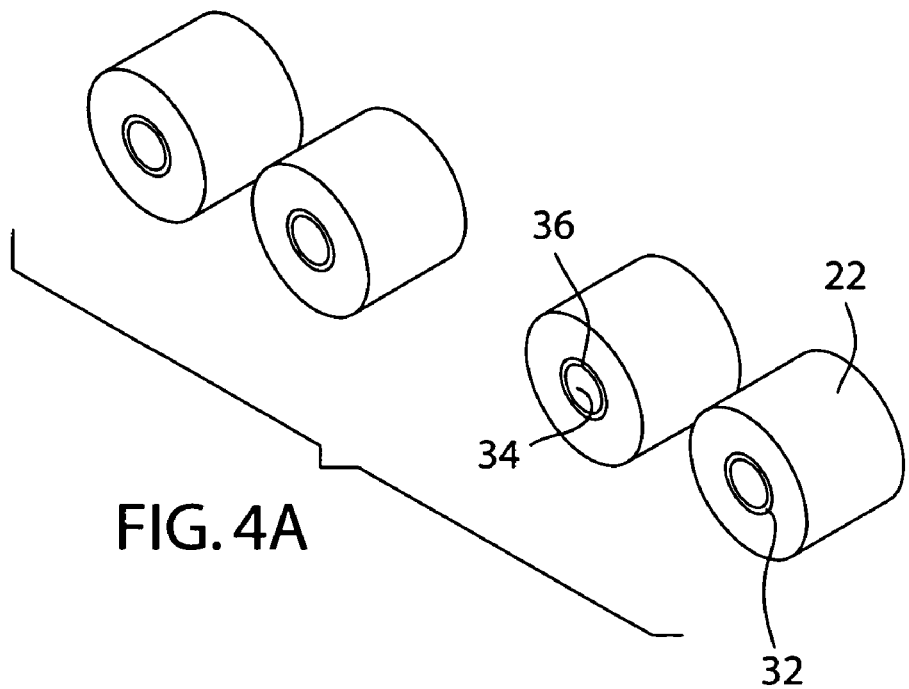
FIG. 4 is a top perspective view of a single roller assembly 4B and race of rollers 4A.
Figure 4B:
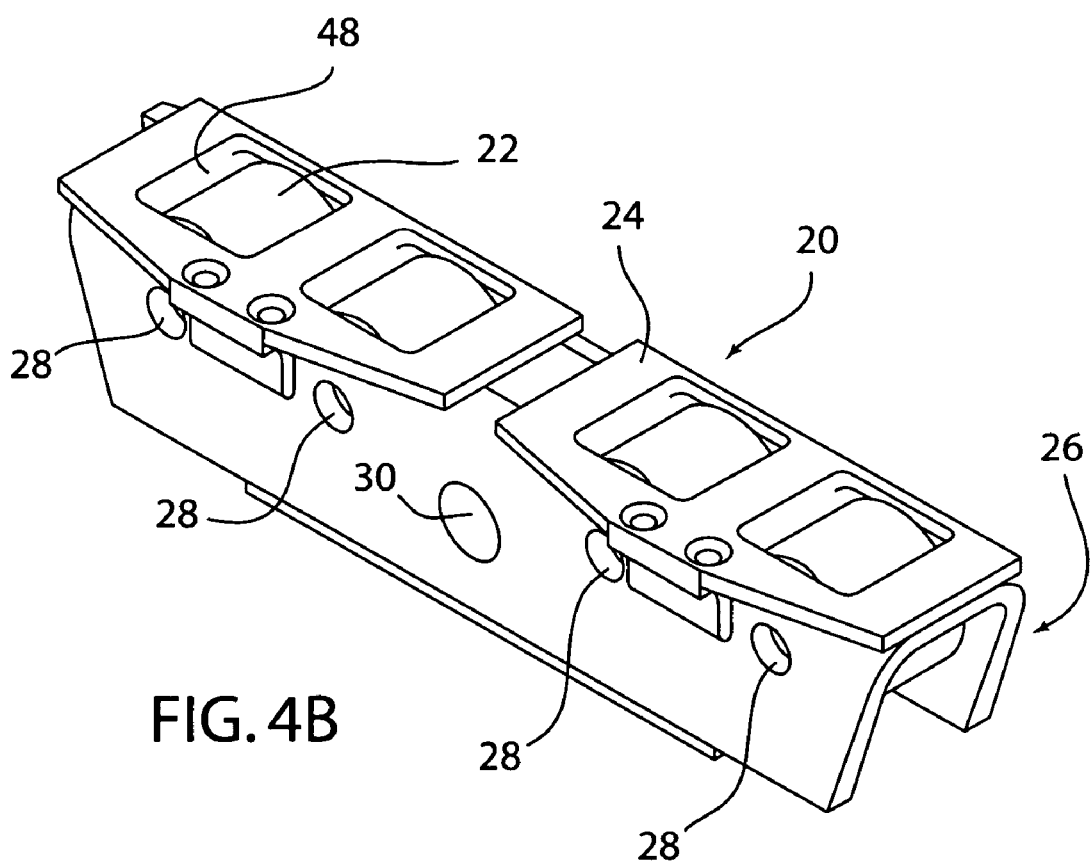
Figure 5:
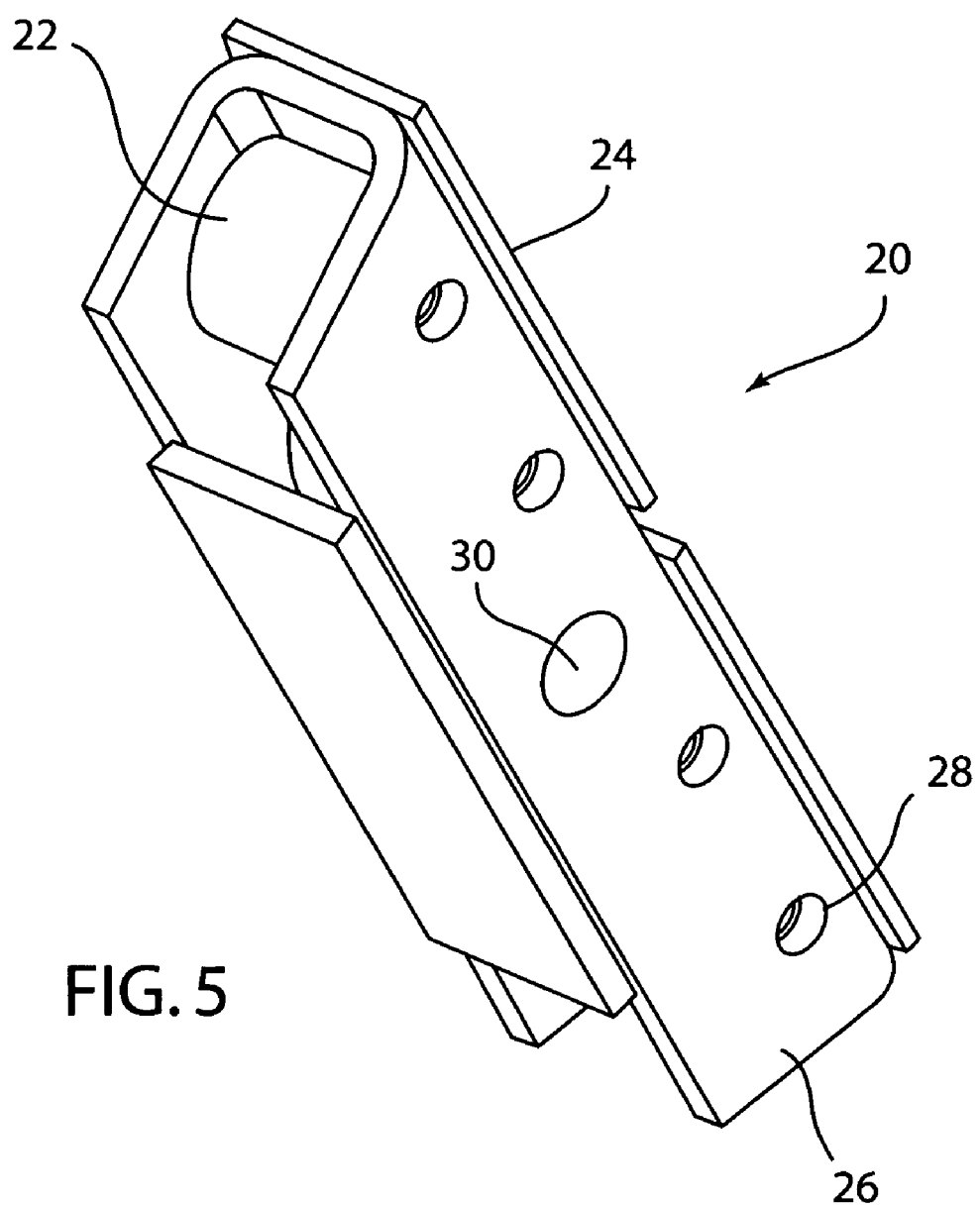
FIG. 5 is a bottom perspective view of a single roller assembly.

The current invention solves these problems by integrating a pivoting roller assembly, generally shown at 20 (FIGS. 4 and 5), at loaded contact points in the ladder sections. As shown, the present invention is configured for use in aerial ladders on fire trucks, though the invention could be applied to any multiple-section ladder assembly. Referring to FIG. 4, the present invention roller assembly has at least one roller 22 and at least one roller pad 24. Roller 22 and pad 24 may be made of any of a variety of materials durable enough to withstand the load of the ladder sections and its cargo. For example, and not by way of limitation, a high density polymer such as Nylatron brand molded plastic/polymeric material (The Polymer Corporation, Reading, Pa.), UHMW (ultra high molecular weight) plastic, or metal combinations may be used.

Figure 2:
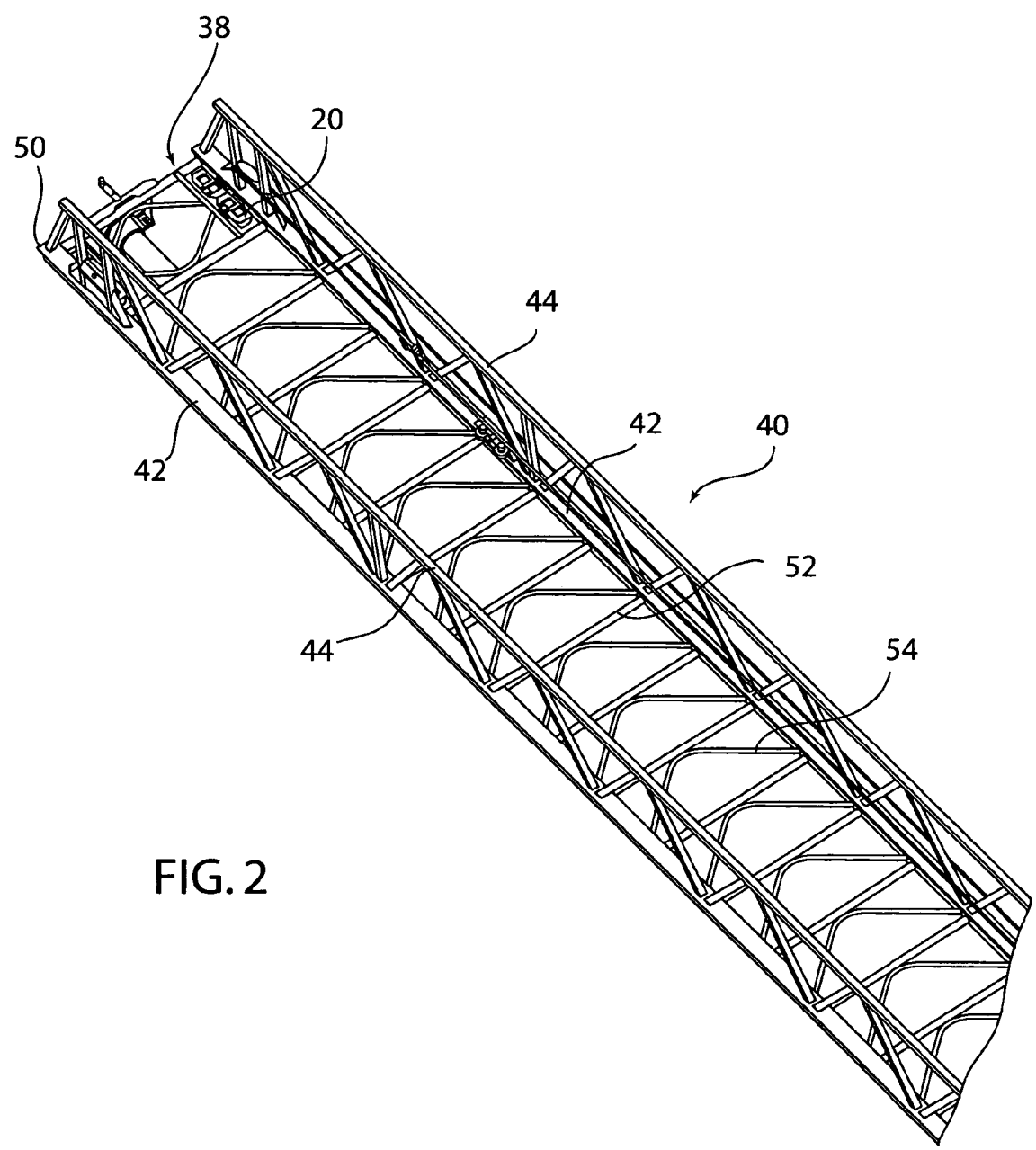
FIG. 2 is a perspective view of apparatus in accordance with the present invention mounted on the end of a section of an aerial ladder.
Figure 3:
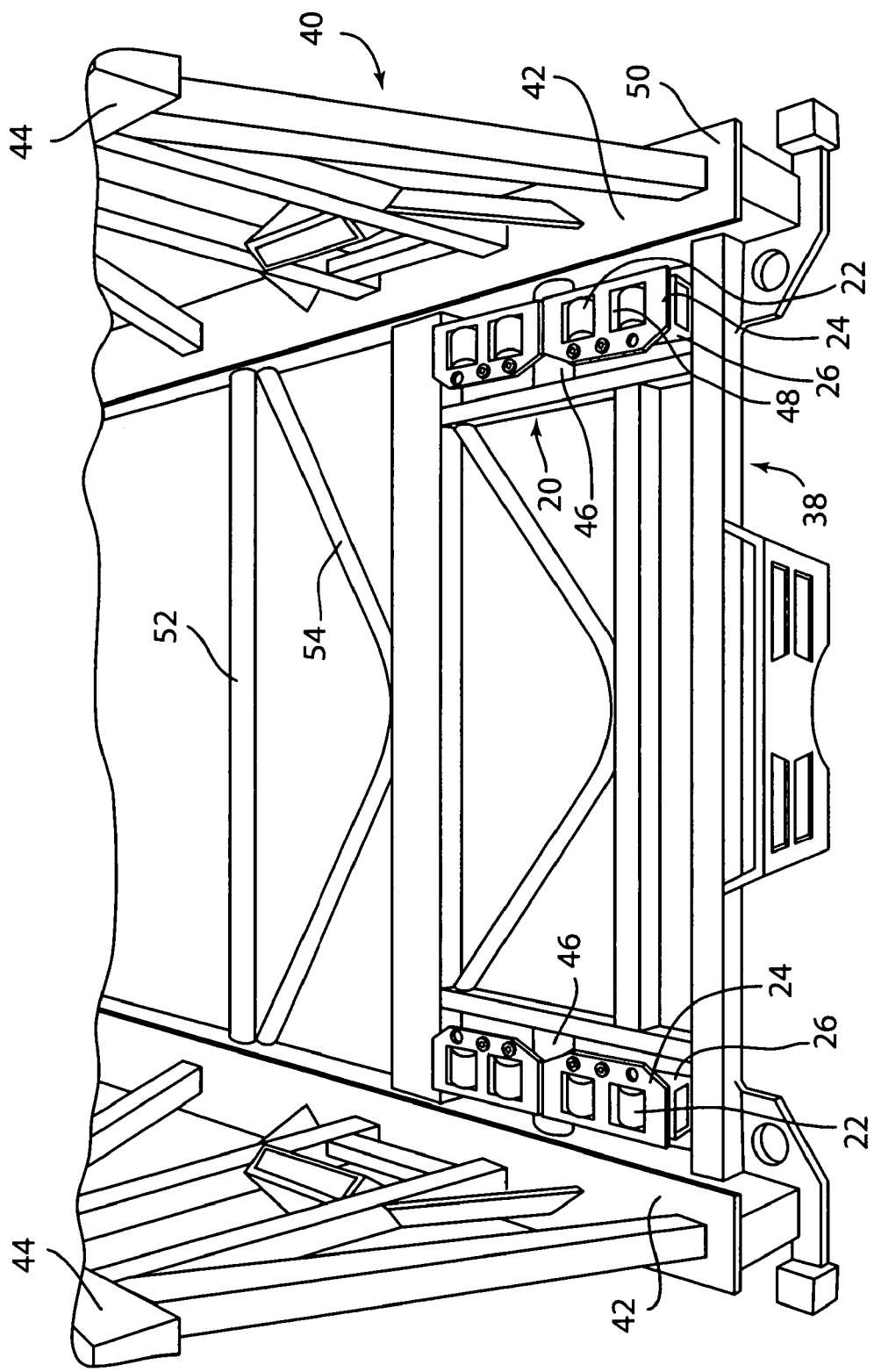
FIG. 3 is a perspective end view of the present invention mounted on the end of a section of an aerial ladder.

The roller 22 and pad 24 are mounted to a roller housing 26. Housing 26 has aligned roller attachment apertures 28 and pivot attachment apertures 30. Roller 22 is rotatably attached to housing 26 using means well known in the art. Pad 24 has an opening 48 defining an aperture through which roller 22 extends. Within housing 26, rollers 22 may be flush or extend only a few millimeters beyond the outer surface of pad 24. This allows a more even load distribution. Pad 24 and rollers 22 may be made of the same material. As an example, FIG. 3A shows roller 22 may include a sleeve 32 having a roller bearing race and an internal wall 34 to create a bore 36 suitable for placement of a bolt, pin or rivet (not shown) having an external diameter less than the diameter of the bore. The bolt could be threaded through and mounted to roller attachment points 28 and through bore 36. Referring to FIGS. 2 and 3, as an example and not by way of limitation, roller assembly 20 is shown placed on the ladder section 40 of a multiple section ladder at a top or distal end 38 of the ladder section 40. Each ladder section is stacked, successively on top of another. Since the illustrated ladder section 40 has handrails 44, each additional section must be of a progressively smaller width to allow "nesting." Using this ladder configuration, ladder 40 may have base rails 50 on each side with slide plates 42, the undersides of which are disposed above roller assembly 20 to allow contact with rollers 22. Ladder 40 also has rungs 52 and "K" braces 54.

Figure 1:
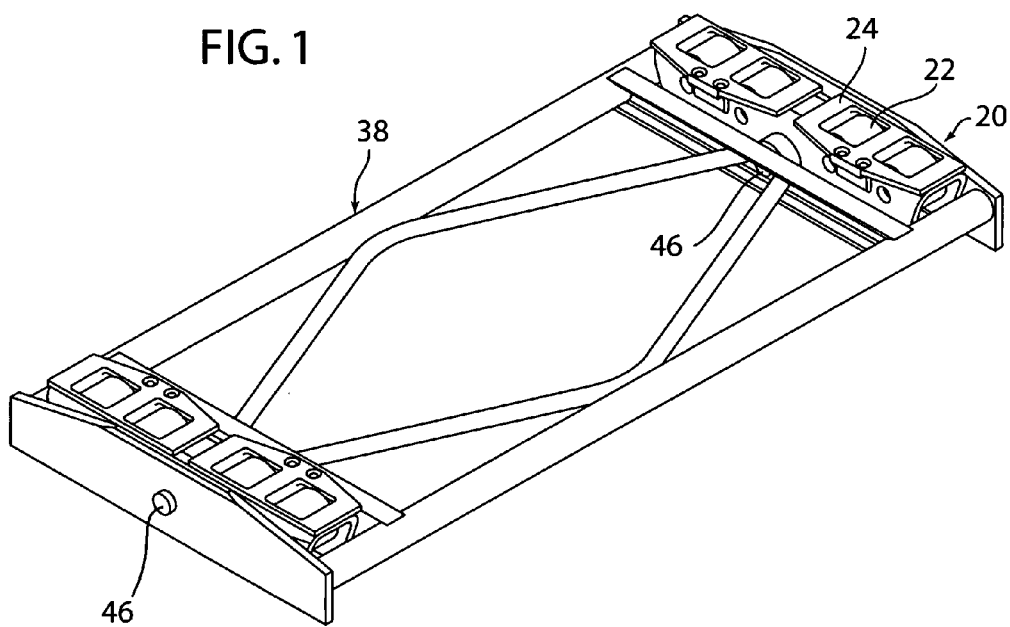
FIG. 1 is a perspective view of an embodiment of the present invention.

FIG. 1 shows a close-up view of the distal end of ladder section 40 shown on FIGS. 2 and 3. Installed on ladder section 40, each roller assembly 20 is pivotally mounted at a point near the center of its longitudinal axis by a pivot pin 46. This allows for constant roller 22 pressure on a moving and often uneven slide plate 42 of an adjacent nested ladder section during extension and retraction. The pivot pins 46 are easily removed from both sides of all ladder sections 40. Multiple pins or a single pin may be utilized for ease of repair or maintenance. Such maintenance may include replacement of rollers 22 or pads 24.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

The invention claimed is:

1. An assembly for a multi-section extension ladder, comprising:
   a roller housing having a length along a central axis and a width, and a plurality of aligned apertures therethrough for rotatably mounting at least one roller therein;
   at least one roller rotatably mounted in said housing;
   said roller housing further comprising a roller pad having an opening defining an aperture through which said at least one roller extends; and
   said roller housing being adapted for pivotal mounting to a ladder section.

2. The assembly of claim 1, wherein said roller and pad comprise a dense polymer.

3. The assembly of claim 1, wherein said roller is flush with or projects slightly beyond an outer surface of said roller pad.

4. The assembly of claim 3, wherein said roller projects through said aperture about 2 millimeters beyond an outer surface of said roller pad.

5. The assembly according to claim 4, wherein at least one roller is rotatably mounted in said housing on each side of said pivotal mounting point.

6. The assembly according to claim 1, wherein said housing is adapted for pivotal mounting at a point approximately central to the length of said axis.

7. The assembly according to claim 5, wherein a pair of rollers is rotatably mounted in said housing on each side of said pivotal mounting point.

8. The assembly of claim 1, wherein said roller and pad comprise an ultra high molecular weight plastic.

9. The assembly of claim 1, wherein said roller and pad comprise a metal.

10. A multiple-section ladder, comprising:
    first and second ladder sections;
    said ladder sections having parallel base rails and rungs connecting to said base rails, said second section being nested within said first section and having a slide plate on a surface of its base rail which faces said first section;
    a roller assembly having a roller housing wherein at least one roller is rotatably mounted therein, said roller housing further comprising a roller pad having an opening defining an aperture through which said at least one roller extends, and said roller housing being pivotally mounted to said first ladder section at an end distal to its base; and
    said slide plate of said second section being juxtaposed to said roller assembly of said first ladder section.

11. A ladder according to claim 10, wherein said roller and pad each comprise a dense polymer.

12. A ladder according to claim 11, wherein said housing is mounted pivotally at a point approximately central to the length of the longitudinal axis of said housing.

13. A ladder according to claim 11, wherein said roller is rotatably mounted in said housing on each side of said pivotal mounting point.

14. A ladder according to claim 11, wherein a pair of rollers is rotatably mounted in said housing on each side of said pivotal mounting point.

15. A ladder according to claim 11, wherein a housing as recited therein is mounted adjacent each rail of said first ladder section.

* * * * *